United States Patent
Allison et al.

(10) Patent No.: US 6,250,729 B1
(45) Date of Patent: Jun. 26, 2001

(54) DUAL OPENING SLIDING CONSOLE FOR USE WITH A VEHICLE

(75) Inventors: Johnny Hugh Allison, Plymouth; Richard Morabito, Grosse Ile; Gerald Arthur Heath, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/405,021

(22) Filed: Sep. 27, 1999

(51) Int. Cl.$^7$ .................................................. B65D 43/14
(52) U.S. Cl. ............................. 312/324; 16/323; 49/326; 49/193; 220/812; 220/813; 220/817
(58) Field of Search .................................. 220/811, 812, 220/813, 817, 836, 345.1, 345.2, 351, 345.4; 224/282, 281, 539; 312/324, 327, 328, 297; 49/326, 382, 193; 160/36, 107; 296/37.8; 16/232, 231, 230, DIG. 23

(56) References Cited

U.S. PATENT DOCUMENTS

| | | |
|---|---|---|
| 2,936,206 | 5/1960 | Wilmer et al. . |
| 3,022,107 | 2/1962 | Daniels . |
| 3,321,100 | 5/1967 | Toma . |
| 3,356,409 | 12/1967 | Belsky et al. . |
| 3,949,917 | 4/1976 | Mann . |
| 4,300,709 | 11/1981 | Page, Jr. . |
| 4,589,567 | 5/1986 | Pircher . |
| 4,809,897 | 3/1989 | Wright, Jr. . |
| 4,942,271 | 7/1990 | Corsi et al. . |
| 5,067,625 | 11/1991 | Numata . |
| 5,144,720 | * 9/1992 | Aihara et al. ............................ 16/232 |
| 5,173,992 | 12/1992 | Aihara et al. . |
| 5,195,272 | * 3/1993 | Yamada ................ 16/231 X |
| 5,209,016 | * 5/1993 | Yamada ................ 16/231 X |
| 5,210,906 | 5/1993 | Aihara et al. . |
| 5,212,849 | * 5/1993 | Aihara .................................. 16/232 |
| 5,647,652 | 7/1997 | Zalewski et al. . |

FOREIGN PATENT DOCUMENTS

| | | |
|---|---|---|
| 57-198138 | 12/1982 | (JP) . |
| 59-102637 | 6/1984 | (JP) . |
| 3-189249 | 8/1991 | (JP) . |

* cited by examiner

Primary Examiner—Janet M. Wilkens
(74) Attorney, Agent, or Firm—Gregory P. Brown

(57) ABSTRACT

A sliding console (20) for use with a vehicle. The console (20) includes a padded upper portion (40) to serve as an arm rest. The console (20) includes a slider assembly (52) that moves toward and way form the front end (32) and rear end walls (34) to allow the padded upper portion (40) to be adjusted.

19 Claims, 4 Drawing Sheets

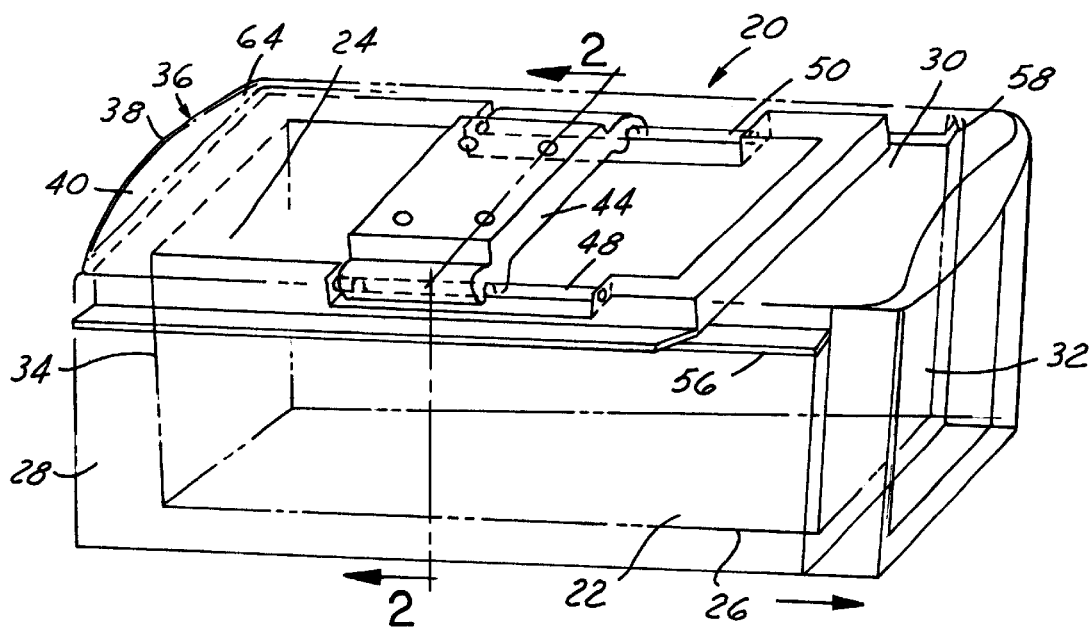
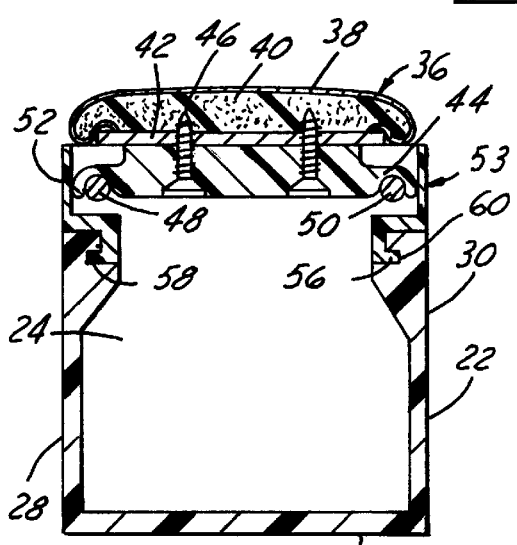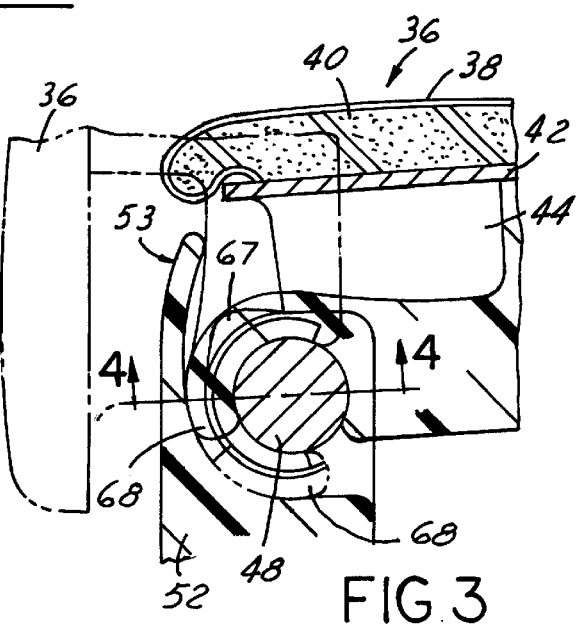
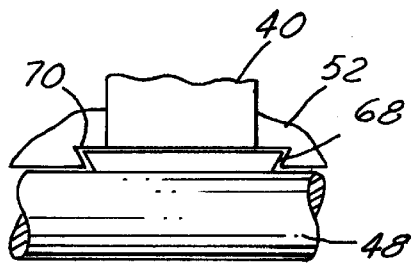

DUAL OPENING SLIDING CONSOLE FOR USE WITH A VEHICLE

TECHNICAL FIELD

The present invention relates generally to a console for use with a vehicle. More specifically, the present invention relates to a dual opening console with a slidable armrest assembly.

BACKGROUND OF THE INVENTION

It is well known to provide a console between the driver and front passenger seats in an automotive vehicle. The console has many functions. It may operate as an armrest, a storage unit, a writing table or a cup holder. Three types of center consoles exist, those that open on one side, those that open on two sides, and those that open from the front. Each type of console has disadvantages.

Consoles that open on one side only, typically open in a manner that limits access only to the driver of the vehicle. Further, those that open on one side only are not suitable in today's global marketplace; i.e., a console suitable for a right-hand drive vehicle would not be suitable for a left-hand drive vehicle. While they provide access to both the driver and passenger in the front seat, they do not allow access to passengers sitting in the rear seats. Finally, consoles that open on two sides typically utilize a complex dual-hinge system, such systems result in increased manufacturing costs.

Additionally, current console assemblies lack user friendliness in a variety of areas. For example, as stated above, drivers and passengers in the front seats often use the console top as an armrest. However, because people are built differently, sit in vehicle seats differently than others, and sit closer to the steering wheel than others, current consoles are unable to provide user armrests that are uniformly comfortable and adjustable in all positions for all people. Therefore, there is a need in the art for an inexpensive console that provides all drivers and passengers of the vehicle with a comfortable weight bearing surface to act as an armrest at little, if any, additional cost.

SUMMARY OF THE INVENTION

It is therefore an object of the present invention to provide a console for use with a vehicle that has an adjustable armrest assembly. It is a further object of the present invention to provide a slidable armrest assembly for a dual opening console.

It is yet another object of the present invention to provide a slidable console assembly that is user friendly and relatively inexpensive.

In accordance with the objects of the present invention, a console for use with an automobile vehicle is provided. The console includes a compartment having a bottom surface, a first side wall, a second side wall, a front end well, and a rear end well. The compartment has a lid connected thereto with the lid being operative to open from any of the first side or the second side. The lid has a padded weight bearing arm support positioned thereon with the lid and the padded weight bearing arm support being operative to move toward and away from the front end wall and the rear end wall. The lid has a slider assembly which affixes the lid to the compartment to allow such movement of the lid away from any of the front end or the rear end walls.

In accordance with a further object of the present invention, a lock assembly hingeably connects the lid with the compartment such that the lid can be opened from more than one side, but only on one side at a time. The lock assembly includes at least one lock bar located on the lid. The at least one lock bar extends between the opposite side walls or end walls of the compartment. The at least one lock arm rides on two parallel pivot pins. The at least one lock arm snaps onto the pivot pins by a respective flange that allows the lid to open in one direction only at a time.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a perspective view of a vehicle console in accordance with a preferred embodiment of the present invention;

FIG. 2 is a cross-sectional view of vehicle console along line 2—2;

FIG. 3 is an enlarged sectional view of a pivot mechanism for a slidable vehicle console in accordance with a preferred embodiment of the present invention;

FIG. 4 is a sectional view of the pivot mechanism of FIG. 3 along the lines 4—4;

DESCRIPTION OF THE PREFERRED EMBODIMENT

Figure 5:
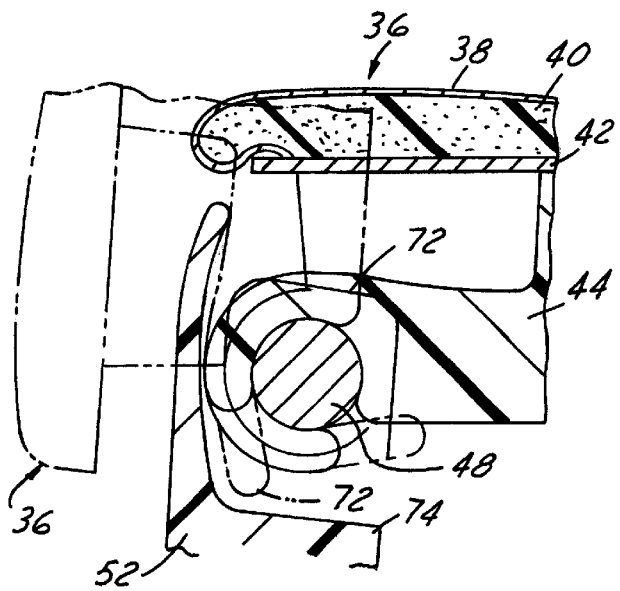
FIG. 5 illustrates an alternative embodiment of a pivot mechanism for a slidable vehicle console in accordance with a preferred embodiment of the present invention.

Referring to FIGS. 1 and 2, one embodiment of a vehicle console 20 according to the present invention is shown. The console 20 is preferably positioned between a driver's seat and a passenger's seat of a vehicle. A console 20 as shown is generally elongated and rectangular in shape to fit the space between the seats. It should be understood however that the console may take on a variety of different shapes. Further, while the disclosed console is preferably a dual opening console, i.e., opens from both sides, the disclosed invention may alternatively be utilized with a single opening console.

The console 20 includes a rectangular elongated member or lower console housing 22 defining a compartment 24 therewithin. As shown, the compartment 24 includes a bottom 26, a first side wall 28, a second side wall 30, a front end wall 32, and a rear end wall 34. A lid 36 is connected to the compartment 24. As will be explained later, the lid 36 may be hinged to any one of the walls; i.e., the first side wall 22 and the second side wall 24. Attaching the lid 36 in this manner, enables the lid 36 to be opened in any one of two directions, i.e., front to back or side to side to allow access from any point adjacent to console 20.

The lid 36 includes an outer lid 38 that is preferably filled with a foam cushion 40 and an inner lid 42 that is disposed beneath the foam cushion 40. The foam cushion 40 forms an arm rest or comfortable weight bearing surface for a user's arm. The lid 36 is disposed above a dual opening lock bar 44. Preferably, the inner lid 42 is secured to the dual opening lock bar 44 by known securing means 46, such as screws or the like. Alternatively, the dual opening lock bar 44 may be integrally molded with the inner lid 42 to form an integral single part. The lock bar 44 preferably rides on a pair of parallel pivot pins 48, 50 that are positioned within the compartment 24. The compartment 24 is preferably in communication with a lower slide housing 52 within which the first and second pivot pins 48, 50 are housed.

Figure 6:
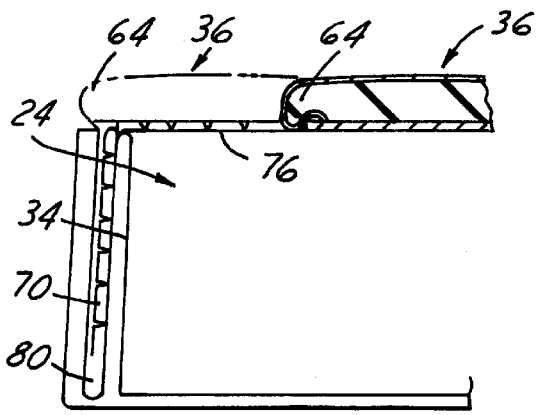
FIG. 6 illustrates a side cross-sectional view of a rear portion of a vehicle console in accordance with a preferred embodiment of the present invention.

The lower slide housing 52 has an upper portion 53 and a base portion 54. The base portion 54 has a pair of horizontal flanges 56, 58 that fit into a respective horizontal slot 60, 62 formed in the opposing side surfaces 28, 30 of the compartment 24. The interaction of the pair of horizontal flanges 56, 58 and the horizontal slots 60, 62 allow the outer lid 38 to slide back and forth on the lower console housing 22. Additionally, the area where the horizontal flanges 56, 58 bear on the slots 60, 62 offers support to the upper console lid 38 when it is in its forward extended position. Because the dual opening lock bar 44 rides on the lower slide housing 52 as the lid 36 is slid, the dual opening bar 44 and thus the lid 36 can open in all positions. The lid 36 has a rear portion 64 that has a sliding shade 76 or a tambour door attached thereto (FIG. 6). The sliding shade 76 acts to keep dust and other undesirables out of the console 20 when the lid 36 is pulled forward. The shade or tambour door 76 also adds to the look or appearance of the console 20.

FIGS. 3 and 4 illustrate an enlarged sectional view through the pivot pin 48. While the structure and operation of the pivot pin 48 is discussed specifically, it should be understood that the description of the pivot pin 48 applies equally to the pivot pin 50. As shown, the dual open lock bar 44 has a pivot arm 67 which engages the pivot pin 48. The pivot arm 67 employs a dove tail 68 that interlocks with a mating cut 70 formed in the slide housing. In the normally closed position, shown in FIG. 3, the pivot arm 67 is supported on the upper portion of the pivot pin 48. In an open position, shown in phantom in FIG. 3, the pivot arm 67 rotates around the pivot pin 48 allowing the lid 36 to be rotated to an open position. When the lid 36 is opened, the dove tail 68 and the dove tail mating cut 70 interlock and prevent the removal of the lid 38 until it is closed.

FIG. 5 illustrates an alternative embodiment for preventing the removal of the upper lid 38 when the lid 36 is in an open position. In this design, an extended snap-on flange 72 is employed which snaps onto the respective first and second pivot pins 48, 50. The snap-on flange 72 extends further around the pins 48, 50 in a tangential direction then the prior dove tail 68 (FIG. 3) in order to prevent the removal of the lid 36 when opened and allow it to open with the same friction resistance as other designs. The console 20 in this embodiment, includes a lower clearance shelf 74 to allow the snap-on flange 72 to rotate around the respective pins 48, 50 without interference with the slide housing 52. When the lid 36 is opened, as shown in phantom lines, the snap-on flange 72 is configured to prevent the lid 36 from being pulled off. Similarly, when the lid 36 is in a closed position, it can be pivoted in the opposite direction without the flange 72 preventing its opening.

FIG. 6 illustrates the rear portion 64 of the console 20 in accordance with the present invention. The rear portion 64 of the lid 36 includes a tambour door 76 attached thereto. When the lid 36 is slid forward, its rear portion 64 also moves forward which pulls forward the tambour door or shade 76 connected thereto. This ensures that the rear opening to the compartment 24 is covered by the tambour door 76 when the lid 36 is slid toward the front end wall 32. When the lid 36 is in its rearward position, as shown in phantom, the tambour door 76 slides into a storage compartment 80 and is not visible. A pair of grooves (not shown) are preferably located in the opposing side surfaces 28, 30 of the compartment 24 to guide the tambour door 76 as it slides. The tambour door 76 also offers a pleasant looking design for the console 20 from the perspective of a rear passenger both when it is employed and when the console lid is in the rear position, i.e., the tambour door 76 is not visible.

Figure 8:
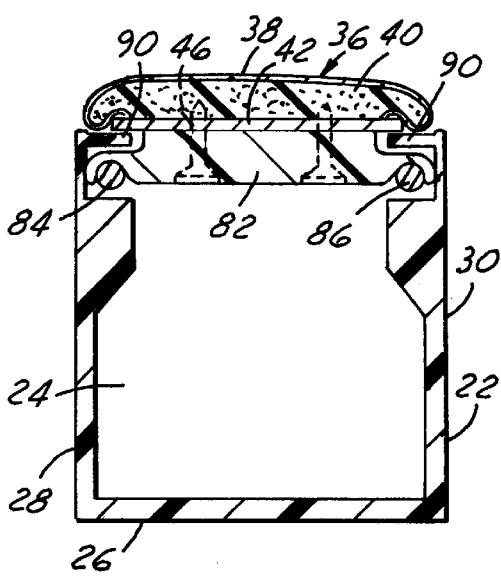
FIG. 8 is a cross-sectional view of the vehicle console of FIG. 7 along the line along the line 8—8.
Figure 7:
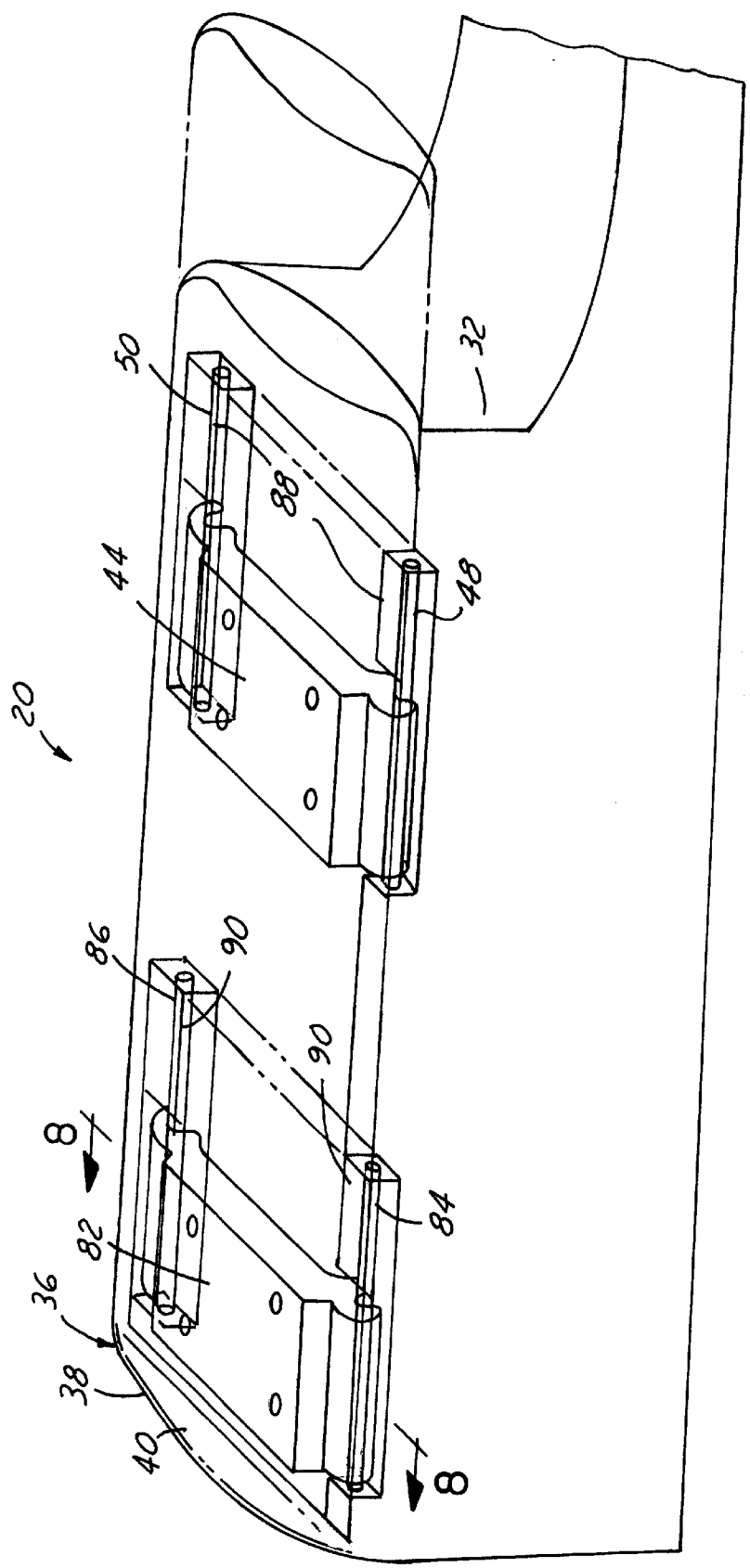
FIG. 7 is a perspective view of an alternative slidable vehicle console in accordance with another preferred embodiment of the present invention.

FIGS. 7 and 8 illustrate another embodiment of a sliding console 20 in accordance with the present invention. The features of this embodiment that are the same as the prior embodiment are referred to by the same reference numbers. In this embodiment, the console 20, includes a second lock bar 82 that is also attached to the inner lid 42. The lock bar 82 rides on a second pair of parallel pivot pins 84, 86. The second pair of parallel pivot pins 84, 86 are preferably positioned near the rear portion 64 of the console 20. The length of the pivot pins 48, 50, 84, 86 are preferably each one half the length of the pivot pins in the prior embodiment.

The lock bars 44, 82 preferably each slide under a pair of locking flanges 88, 90 that hold the bars 44, 82, in position when the lid 36 is extended forward, as is shown in phantom lines in FIG. 7. With this configuration, the dual opening lid 36 cannot be opened in any direction when it is extended forward. This design has fewer parts than the prior embodiment.

Figure 9:
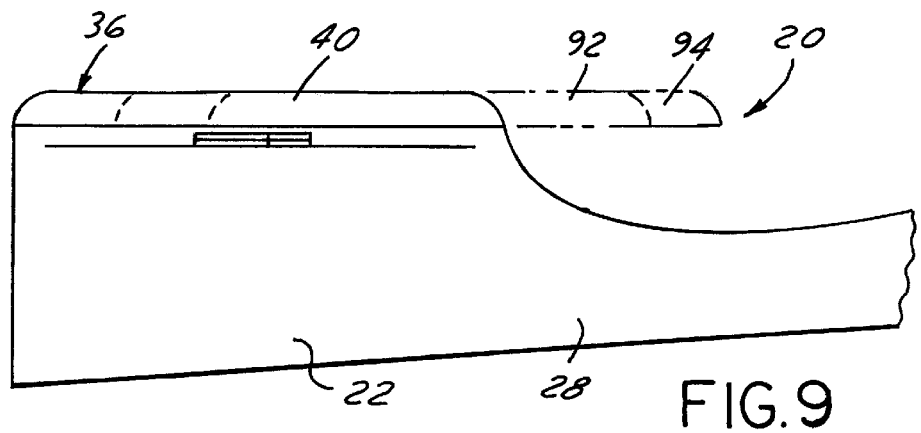
FIG. 9 is a side view of a vehicle console with the lid in a closed position in accordance with a preferred embodiment of the present invention.
Figure 10:
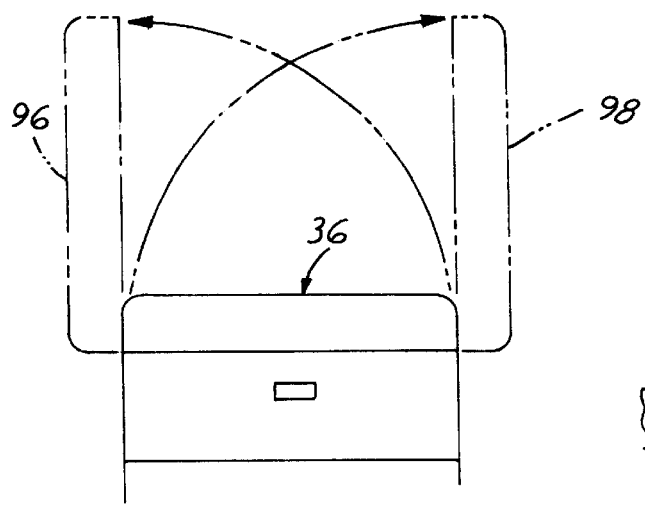
FIG. 10 illustrates a lid of a dual opening vehicle console in two open positions in accordance with a preferred embodiment of the present invention.

FIG. 9 is a side view of the console 20 with the lid 36 in a closed and fully rearward position. The lid 36 is shown in phantom lines in both a partially extended position 92 and a fully extended position 94. FIG. 10 illustrates the lid 36 in a closed position. The lid 36 is shown in phantom lines in an open position 96, pivoted around pivot pin 48. Similarly, the lid 36 is shown in phantom lines in an open position 98, pivoted around pivot pin 50.

Figure 11:
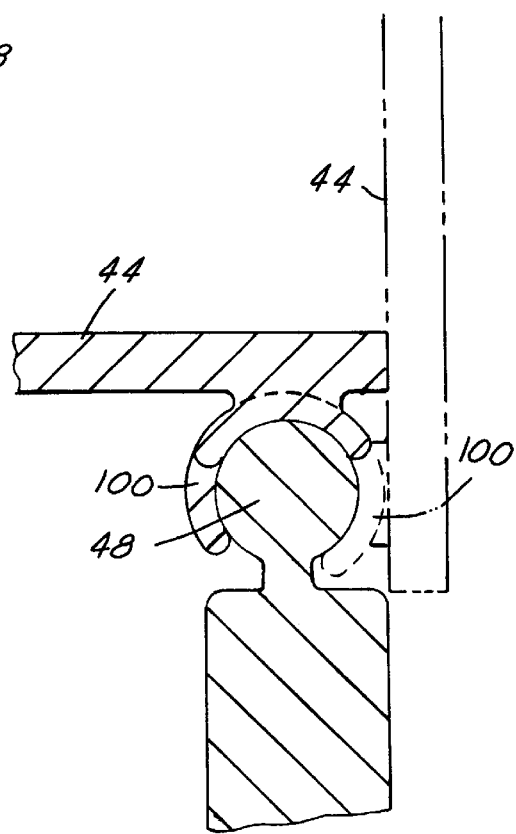
FIG. 11 illustrates a parallel pivot pin arrangement for a slidable vehicle console in accordance with a preferred embodiment of the present invention.

FIG. 11 illustrates the snap-on guides 100 of the dual lock bar 44 as positioned on the parallel pivot pin 48. obviously, an identical snap-on guide 100 is positioned on the parallel pivot pin 50. The lock bar 44 is shown in phantom lines in an open position with the snap-on guide being partially rotated around the pivot pin 48.

The dual opening sliding console assembly of both FIGS. 1 and 7 are advantageous in that they have very few moving parts and are easily serviceable if necessary. It should be understood that the design can be adapted into existing consoles adding the features of dual opening as well as a sliding armrest assembly with a minimal amount of change and cost to the existing console. The sliding armrest offers sturdy, flange supports for the resting of the arm on the extended area of the lid, at the same time, the lid can be easily opened. Two methods of anti-removal flanging on the sliding bar have been utilized to prevent its removal while it is opened. Further, an alternate for the sliding console would allow the armrest to be slid forward with it remaining latched closed until it is returned to its home position.

Many modifications and variations of the present invention are possible in light of the above teachings. Therefore, within the scope of the appended claims, the present invention may be practiced other than as specifically prescribed.

What is claimed is:

1. A console for use with an automotive vehicle comprising:
   a compartment including a bottom, a first side wall, a second side wall, a front end wall, and a rear end wall;
   a lid connected to said compartment, said lid operative to open from any of said first side or second side;
   said lid operative to move toward and away from said front end wall and said rear wall;
   a lock assembly connecting said lid to said compartment such that said lid opens only on one side at a time, wherein said lock assembly includes a pair of pivot arms operative to engage said compartment, and
   a slider assembly connected to said lid and in sliding communication with said compartment such that said slider assembly and said connected lid are moveable away from said front end or rear end walls.

2. The console as recited in claim 1, further comprising:
   a lock bar extending longitudinally between opposite side walls and connecting said pair of pivot arms, said lock bar operative to pivot back and forth such that when one pivot arm is lifted the other pivot arm is depressed allowing only one side of the console to be opened.

3. The console as recited in claim 1, wherein said slider assembly supports an armrest thereon.

4. The console as recited in claim 3, wherein said slider assembly is operative to move to an extended position away from the front end wall and a retracted position adjacent said rear end wall.

5. The console as recited in claim 4, wherein said lid may be opened when said slider assembly is in the extended position.

6. The console as recited in claim 1, further comprising a shade attached to a rear portion of said lid, such that when said lid is slid toward said front end wall, a portion of said compartment adjacent said rear end wall is uncovered by said lid, said shade covers said portion of said compartment.

7. The console as recited in claim 6, further comprising a storage compartment located at the rear of said compartment wherein when said lid is slid toward said rear end wall, said shade is stored in said storage compartment.

8. The console as recited in claim 1, wherein said lock assembly is part of said slider assembly, which includes a lock bar secured to said lid, said lock bar being in sliding engagement with a pair of parallel pivot pins allowing said slider assembly to move away from said front end wall or said rear end wall.

9. The console as recited in claim 8, further comprising a pair of slider assemblies.

10. A console for use with an automotive vehicle, the console having an outer housing, comprising:
    a compartment including a bottom, a first side wall, a second wall, a front end wall, and a rear end wall;
    a lid connected to said compartment, said lid operative to open from any of said first side wall and said second side wall;
    a lock assembly connecting said lid to said compartment such that said lid opens only on one side at a time, wherein said lock assembly includes a lock bar having a lock located on either side of said lid, said lock assembly being slideable toward and away said front end wall and said rear end wall with respect to said compartment.

11. The console as recited in claim 10, wherein said lock assembly further comprises a pair of pivot pins disposed on opposing ends of said compartment for engagement with a respective end of said lock bar.

12. The console as recited in claim 11, wherein said lid and lock assembly are slidable on said pair of pivot pins to allow said lid to be moved as desired by a user.

13. The console as recited in claim 12, wherein either side of said lock bar has a flange portion that engages each of said pair of pivot pins such that when said lid is opened on one side said opposing flange portion rotates around said opposing pivot pin to prevent said lock bar from opening from more than one side at a time.

14. The console as recited in claim 13, wherein each of said ends of said lock bar employ a dovetail that interlocks with a matching cut formed in said compartment.

15. The console as recited in claim 13, wherein a shade is secured to a rear portion of said lid, so that as said lid is slid forward leaving a portion of said compartment is not covered by said lid, said shade covers said compartment portion that is exposed.

16. A console for use with an automotive vehicle, comprising:
    a compartment including a bottom, a first side wall, a second side all, a front end wall, and a rear end wall;
    a lid connected to said compartment, said lid operated to open from any of said first side wall or said second side wall; and
    a slider assembly connected to said lid and in sliding communication with said compartment, such that said lid and said slider assembly are moveable away from and toward said front end or rear end walls.

17. The console as recited in claim 16, wherein said slider assembly includes a lock bar having a pivot arm located on either end of said lock bar.

18. The console as recited in claim 17, wherein said compartment includes a pair of pivot pins upon which the lock bar slides to slide said lid.

19. The console as recited in claim 18, wherein said lid may be opened in a fully extended position.

* * * * *